Dec. 5, 1967   T. O. OLSEN   3,355,937
METHOD OF TESTING VAULTING POLES
Filed Jan. 28, 1965
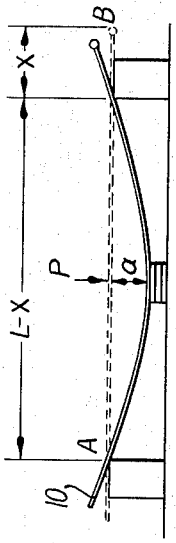
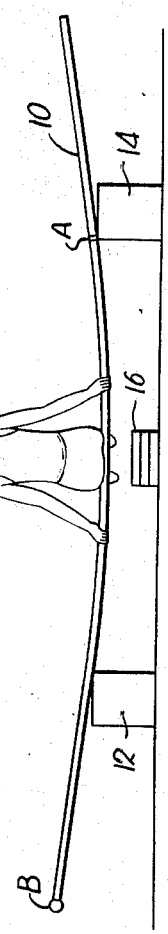
INVENTOR.
Thomas O. Olsen
BY
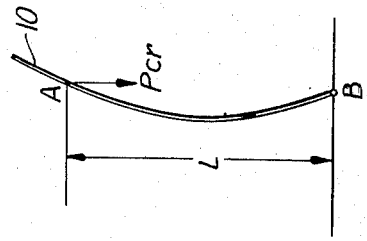
ATTORNEYS.

United States Patent Office 3,355,937
Patented Dec. 5, 1967

3,355,937
METHOD OF TESTING VAULTING POLES
Thomas O. Olsen, Salina, Kans., assignor to Thermo-Flex, Inc., Salina, Kans., a corporation of Kansas
Filed Jan. 28, 1965, Ser. No. 428,732
2 Claims. (Cl. 73—100)

ABSTRACT OF THE DISCLOSURE

A method of testing vaulting poles for buckling resistivity by supporting the pole as a simple beam upon supports located at predetermined locations along the pole, applying the vaulter's weight to the pole between the supports, and sensing the resulting deflection of the pole.

---

This invention relates to a testing method, and more particularly, to a method for testing relatively long, slender poles of the type used for vaulting in order to insure that the poles will not buckle under the weight of the vaulter during use.

In recent years the use of vaulting poles manufactured from fiber glass reinforced thermosetting and thermoplastic, synthetic resinous materials, has become widespread. Poles of such construction have been found to be ideally suited for this purpose because of their relatively light weight and high-strength features. Further, it has been found that, if properly constructed, fiber glass poles present desirable flexure and resiliency characteristics which make them well suited for pole vaulting operations.

The springiness or resiliency of poles of this type has led to a practice among vaulters to attempt to select a pole which will bend substantially during a vault in order to obtain maximum benefit from the restoring force of the pole itself. This has caused some vaulters to select poles which are not strong enough to properly support their weight, leading to buckling of the poles during the vault and, in some cases, to serious injury to the vaulters.

Instances of injuries resulting from poles buckling during vaults has led to a widely recognized need for a way of testing each pole to determine whether or not it is safe from buckling. No readily available answer for this need has been forthcoming, however, because of the wide number of variables which must be taken into consideration in determining the buckling resistance of each vaulting pole. For example, the weight of the vaulter and the position of his handhold with respect to the ground-engageable end of the pole, as well as the least moment of inertia, the least radius of gyration, and the modulus of elasticity of the particular pole involved, are all values which vary from pole-to-pole and vaulter-to-vaulter and must be taken into account. Indeed, the position of the vaulter's handhold which determines the location along the pole at which the vaulter's weight will be applied thereto may very well vary from jump-to-jump and is selected with consideration being given to the particular height of the crossbar sought to be cleared by the vaulter's body during the jump.

Testing methods employed in a laboratory, using largely hypothetical values for the foregoing variables, have been found to be inadequate for determining the buckling strength of each pole under the actual conditions of a track and field meet or the like.

Accordingly, it is the primary object of this invention to provide a method of testing vaulting poles to determine that each pole is safe from buckling under the conditions encountered during use of the poles.

Another very important object of this invention is to provide a pole-testing method which is simple to carry out, yet which is highly accurate and takes into consideration all of the variable factors encountered during each jump.

Still a further object of the instant invention is to provide a pole-testing method which requires a minimum amount of equipment for conducting the test.

Yet another highly important object of the invention is the provision of a pole test which is capable of being carried out quickly and in full view of all spectators so that the results of the test are readily observable to all concerned. In this manner, all interested persons can be assured that all pole vaulters have been required to maintain predetermined safety standards and that no contestant is permitted to ignore these standards by using a vaulting pole which is dangerously close to the buckling point of the pole in order to secure whatever advantage may accrue to the vaulter from excessive bending of the pole during the jump.

These and still other important objects of the invention will be more fully explained or become evident in the following specification and claims.

In the drawing:

FIGURE 1 is a schematic diagram showing the application of bending force to a pole during a vault;

FIG. 2 is a schematic diagram showing a pole supported as a simple beam with a concentrated load applied to a section of the pole selected to result in deflection of the pole proportional to the bending of the pole when a load is applied as shown in FIG. 1;

FIG. 3 is an elevational view of a vaulting pole supported at the point of the vaulter's upper handhold and adjacent the ground-engageable end of the pole;

FIG. 4 is a view similar to FIG. 3 but showing the supports in position for testing the pole and an indicator positioned beneath the pole to measure pole deflection;

FIG. 5 is a view similar to FIG. 4 showing deflection of the pole when supporting the weight of a vaulter; and FIG. 6 is a plan view of a measuring stick calibrated to indicate the proper position for one pole support.

Vaulting poles are relatively long, slender members and may be considered for all practical purposes, as "long columns" where the slenderness ratio (length divided by least radius of gyration, both in inches) is sufficiently great that the failure of such poles may be considered to result solely from the stresses induced by sidewise bending.

As illustrated in FIG. 1, the weight of the vaulter can be assumed to be applied to the pole 10 at point A which is the position of the vaulter's upper hand on the pole during the vaulting jump. The ground-engageable end B of pole 10 is free to pivot as the pole supports the vaulter's weight so that the buckling load for any given pole 10 may be computed from Euler's Formula. This formula is expressed $$P_{cr} = \pi^2 \frac{EI}{L^2}$$

where $P_{cr}$=the buckling load in pounds, $E$=the modulus of elasticity in pounds per square inch, $I$=the least moment of inertia in inches$^4$, and $L$=the length from point A to point B in inches.

Since it is desired to insure that the vaulting pole will not reach the buckling limit of the pole under the weight of the vaulter, a factor of safety may be applied when testing the poles. Thus, $P_{cr}=F \times P$ where $F$=a safety factor and $P$=the vaulter's weight.

It has been discovered that a test can be performed on the pole for determining whether or not the safety limits of the pole are exceeded under given vaulting conditions by supporting the pole as a simple beam and applying the weight of the vaulter to the pole. Obviously, no such test would produce valid results if the pole were merely supported at points A and B. Thus, it is necessary to position the supports at locations with respect to pole 10 for conducting such a test where the deflection of pole 10 under the weight of the vaulter can be correlated with the buckling tolerance of the pole.

Inasmuch as it is desired to test the pole as a simple beam by applying the concentrated weight of the vaulter on the beam, an equation may be written for the resulting deflection of the beam. When the load P is applied midway between the supports, the equation for such deflection is $$a = \frac{P(L-X)^3}{48EI}$$

where "$a$"=the maximum deflection of the pole in inches and $(L-X)$=the distance between the supports as illustrated schematically in FIG. 2. Therefore, $$P = \frac{48aEI}{(L-X)^3}$$

Expressed another way, $$\frac{\pi^2 EI}{FL^2} = \frac{48aEI}{(L-X)^3}$$

or $$(L-X)^3 = \frac{48aFL^2}{\pi^2}$$

and $$X = L - \left(\frac{48aFL^2}{\pi^2}\right)^{1/3}$$

If the letter K is permitted to represent all of the constants in this equation, then $$K = \left(\frac{48aF}{\pi^2}\right)^{1/3}$$

and $$X = L - KL^{2/3}$$

It will now be apparent that a test applied to a vaulting pole which is supported at one point located at the position of the upper hand of the vaulter and at a second point located intermediate the first point and the ground-engageable end B of the pole can validly indicate the buckling tolerance.

In carrying out the method of testing vaulting poles pursuant to this invention, a value is chosen for the maximum permissible deflection of the pole under the simple beam test. By substituting this value into the mathematical equations expressed above, as well as the value chosen for the safety factor F, the correct positioning for the supports with respect to the pole to be tested can be quickly and easily determined. It has been found that a value for this "$a$" in the range of approximately 12 inches is entirely satisfactory and a safety factor of 1.25 has been used with entirely satisfactory results. Since "$a$" is directly proportional to P, it is readily apparent that the test can be applied to any other safety factor F by varying the value of "$a$" such that $a = 12 \times 1.25/F$ or $15/F$.

Referring to the drawing, the pole 10 to be tested is laid across a pair of spaced supports 12 and 14 as illustrated in FIG. 3. It is to be noted that a mark is applied on the pole at point A which corresponds to the location of the vaulter's upper handhold during the vaulting jump. This mark may consist of a band of tape or the like which can be easily removed from the pole to permit marking of the pole in another location should the vaulter desire to change the position of his upper handhold for a succeeding jump.

Support 14 is positioned with the inner edge thereof aligned with the point A on pole 10. Support 12 is then moved along pole 10 from point B toward point A a distance which is computed pursuant to the foregoing equations. Since the pole 10 is to be caused to deflect, some suitable means is provided for measuring such deflection in order to ascertain whether or not the deflection of the pole exceeds predetermined limits. Manifestly, if such deflection is too great, this indicates that the pole is not strong enough to safely support the vaulter's weight and the vaulter must either assume a lower handhold or select a pole of larger diameter. One form of marking the maximum limit of permissible pole deflection is simply by stacking objects, such as books 16, or the like immediately beneath the pole approximately midway between supports 12 and 14 as shown in FIG. 4.

The next step in testing the pole pursuant to this method is to cause the weight of the vaulter to be applied to the pole at a point midway between supports 12 and 14 as clearly illustrated in FIG. 5. All that remains is to observe pole 10 for deflection and if this deflection reaches or exceeds the value for "$a$," the pole will touch the books 16. This immediately signifies that the pole is improper. On the other hand, if the pole does not deflect to the top of the stack of book 16, the buckling load of the pole will not be exceeded when the vaulter uses the pole in normal vaulting position which is illustrated schematically in FIG. 1.

It will be obvious that the temperature at which the foregoing test is carried out will have some effect on the deflection of the pole and it is, therefore, important that the test be conducted with pole 10 at the temperature which is likely to be encountered when the pole is in use. Further, it will be apparent to those skilled in the art that it is not necessary to support the pole from below, but that the pole could be suspended from properly selected points and the weight of the vaulter could then be applied between these points. This could be carried out by having the vaulter grasp the pole and swing from the latter with the resultant deflection being measured by any suitable gauge means.

The foregoing test can be quickly and easily accomplished and the test takes into consideration all of the factors bearing upon the buckling strength of the particular pole being tested.

Since the proper distance for support 12 above point B is a function of the value of L and no other variable need be taken into consideration, it is possible to prepare some sort of measuring instrument having the values of X indicated thereon correlated to various positions for point A. Such a rule is broadly designated by the numeral 18. The proper locations for the inner edge of support 12 corresponding to various distances between points A and B are designated on rule 18 by indicia 20. Therefore, to properly position support 12, one need merely measure the distance between points A and B and then place end 22 of rule 18 at point B and mark the appropriate location on pole 10 which corresponds to the distance between points A and B as indicated by indicia 20. Manifestly, the locations of the respective indicia 20 are arrived at from computations pursuant to the aforementioned equations. The support 12 is then moved to the marked position on pole 10 and the supports are in proper positions to insure that the testing of the pole 10 as a simple beam under a concentrated load gives results which are correlated with the buckling tolerance of the pole in actual use.

Whereas, the foregoing description has been predicated upon the use of the vaulter's weight itself to determine the buckling strength of the vaulting pole, and a predetermined safety factor is taken into consideration in locating the position of support 12, other ways of insuring proper safety considerations could be used. For example, the use of an arbitarily selected safety factor such as 1.25 suggested above, could be dispensed with and the actual weight applied to the pole when the same is supported as a simple beam could be increased to some value a selected amount greater than the actual weight of the vaulter. It will be readily apparent to those skilled in the art that the selection of this greater weight would provide the necessary factor of safety when the pole is tested pursuant to the method of this invention.

Having thus described the invention, what is claimed as new and desired to be secured by Letters Patent is:

1. The method of testing to determine that a vaulting pole is safe from buckling in use under a vaulter's weight, comprising:

selecting a standard deflection for the pole within the range of maximum deflection of the pole without buckling;

supporting the pole at a first point along the pole coinciding with the location at which the vaulter places his uppermost hand on the pole while using the pole for vaulting;

supporting the pole at a second point measured from the ground engageable end of the pole and equal to the distance from said ground engageable end to said first point less the computed value of the expression:

$$\left( \frac{48 \times \text{said standard deflection} \times \text{said distance squared}}{\pi^2} \right)^{1/3}$$

applying the weight of the vaulter to said supported pole transversely of the pole and between the points of support thereof; and comparing the actual deflection of said pole from said vaulter's weight with said standard deflection to insure that said actual deflection is no greater than said standard deflection.

2. The method of claim 1, said weight of the vaulter being applied to the pole mid-way between the points of support thereof.

References Cited

FOREIGN PATENTS 127,155  4/1948  Australia.

RICHARD C. QUEISSER, *Primary Examiner.*

JAMES J. GILL, *Examiner.*

J. H. WILLIAMSON, *Assistant Examiner.*